US010070041B2

(12) United States Patent
Park et al.

(10) Patent No.: US 10,070,041 B2
(45) Date of Patent: Sep. 4, 2018

(54) ELECTRONIC APPARATUS AND METHOD FOR TAKING A PHOTOGRAPH IN ELECTRONIC APPARATUS

(71) Applicant: Samsung Electronics Co., Ltd., Gyeonggi-do (KR)

(72) Inventors: Hee-Chan Park, Seoul (KR); Han-Kil Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 14/657,920

(22) Filed: Mar. 13, 2015

(65) Prior Publication Data

US 2015/0319417 A1 Nov. 5, 2015

(30) Foreign Application Priority Data

May 2, 2014 (KR) ........................ 10-2014-0053492

(51) Int. Cl.
*H04N 13/02* (2006.01)
*H04N 5/232* (2006.01)
*G06T 7/593* (2017.01)

(52) U.S. Cl.
CPC ......... *H04N 5/23212* (2013.01); *G06T 7/593* (2017.01); *H04N 5/23245* (2013.01); *H04N 13/0207* (2013.01); *H04N 13/0271* (2013.01)

(58) Field of Classification Search
CPC ............... H04N 5/3745; H04N 5/3696; H04N 13/0018; H04N 5/23293; H04N 5/23229
USPC ..... 348/218, 222.1, 223.1, E08.31, E09.051; 356/218
See application file for complete search history.

(56) References Cited

U.S. PATENT DOCUMENTS 6,020,931 A * 2/2000 Bilbrey .................. H04N 5/222 348/584
8,405,680 B1 3/2013 Cardoso Lopes et al.
2007/0121094 A1* 5/2007 Gallagher .......... G06K 9/00201 356/4.03

(Continued)

FOREIGN PATENT DOCUMENTS

EP 1 830 564 A1 9/2007
EP 2 579 572 A1 4/2013

(Continued)

OTHER PUBLICATIONS

Extended European Search Report dated Sep. 29, 2015 in connection with European Application 15166006.5; 6 pages.

*Primary Examiner* — Sathyanaraya V Perungavoor
*Assistant Examiner* — Peet Dhillon

(57) ABSTRACT

Various exemplary embodiments related to an electronic apparatus and a method for taking a photograph in the electronic apparatus are disclosed, and according to an exemplary embodiment, the electronic apparatus may include a display that displays a screen; a depth sensor that outputs a first image signal and depth information; an image sensor that outputs a second image signal; and a control unit that controls to display a preview screen on the display using the first image signal, obtain both depth information of a photographing moment and an image of the photographing moment using the second image signal in response to a request of photographing, and store the image and the depth information. Also, other various exemplary embodiments may be possible.

14 Claims, 7 Drawing Sheets

START
302 IS CAMERA APPLICATION EXECUTED? NO / YES
304 RECEIVE FIRST IMAGE SIGNAL AND DEPTH INFORMATION FROM DEPTH SENSOR AND RECEIVE SECOND IMAGE SIGNAL FROM IMAGE SENSOR
306 DISPLAY PREVIEW SCREEN CORRESPONDING TO FIRST IMAGE SIGNAL
308 IS FOCUSING APPLIED? NO / YES
310 EXTRACT DISTANCE INFORMATION USING DEPTH INFORMATION, AND APPLY FOCUSING EFFECT ON PREVIEW SCREEN USING DISTANCE INFORMATION
312 IS PHOTOGRAPH TAKEN? NO / YES
314 OBTAIN DEPTH INFORMATION OF PHOTOGRAPHING MOMENT SIMULTANEOUSLY WHILE OBTAINING IMAGE OF PHOTOGRAPHING MOMENT FROM SECOND IMAGE SIGNAL
316 MATCH IMAGE TO DEPTH INFORMATION TO STORE IMAGE AND DEPTH INFORMATION
END

(56) References Cited

U.S. PATENT DOCUMENTS

| | | | | |
|---|---|---|---|---|
| 2011/0169921 | A1* | 7/2011 | Lee .................... | H04N 5/23212 348/46 |
| 2012/0050483 | A1* | 3/2012 | Boross .............. | H04N 13/0018 348/46 |
| 2012/0188420 | A1 | 7/2012 | Black et al. | |
| 2013/0057515 | A1 | 3/2013 | Wilson | |
| 2013/0113890 | A1 | 5/2013 | Lee et al. | |
| 2013/0242058 | A1 | 9/2013 | Bae et al. | |
| 2014/0313362 | A1* | 10/2014 | Heringslack ....... | H04N 5/23293 348/222.1 |

FOREIGN PATENT DOCUMENTS

| | | |
|---|---|---|
| EP | 2 706 746 A2 | 3/2014 |
| EP | 2 720 451 A1 | 4/2014 |

* cited by examiner

ELECTRONIC APPARATUS AND METHOD FOR TAKING A PHOTOGRAPH IN ELECTRONIC APPARATUS

CROSS-REFERENCE TO RELATED APPLICATION(S) AND CLAIM OF PRIORITY

The present application is related to and claims the priority under 35 U.S.C. § 119(a) to Korean Application Serial No. 10-2014-0053492, which was filed in the Korean Intellectual Property Office on May 2, 2014, the entire content of which is hereby incorporated by reference.

TECHNICAL FIELD

The present disclosure relates to an electronic apparatus and a camera technology of the electronic apparatus.

BACKGROUND

Owing to popular propagation of a digital camera, now the digital camera is recognized as an electronic apparatus routinely used by an ordinary person. Using frequency of a camera by the ordinary person has been increasing as many electronic apparatuses such as a cellular phone, a smartphone and so on as well as the digital camera embed the camera.

Thus, in a recent electronic apparatus, a function capable of performing an image and data communication functions in a high speed in addition to a voice communication function are essentially implemented, and in particular, the electronic apparatus includes an imaging module to have a function of the digital camera.

As described above, the digital camera included in the electronic apparatus has functions requested in base photographing, storing and transferring in early days, in order to satisfy various requirements of a user, and technology development for improving performance, quality and function has been performed. Especially, in these days, research with respect to technology capable of applying various image effects to a photographed image has been performed to great extent.

SUMMARY

In order to apply various effects to the photographed image, various information related to the image as well as a high resolution image are obtained.

For this, the electronic apparatus having the camera function, obtains as much meta information related to the image while displaying a preview image using one image sensor, photographs the image according to a photographing instruction by the user, and thus the electronic apparatus may obtain the meta information related to the image and the image.

However, as described above, when the electronic apparatus obtains the meta information (e.g., depth information) related to the image and the image using one imaging sensor, the electronic apparatus obtains the image after obtaining the meta information related to the image first, or the electronic apparatus obtains the meta information related to the image after obtaining the image, and thus there is a difference between an obtaining time of the meta information related to the image and an obtaining time of the real image.

Especially, when the electronic apparatus obtains the depth information (also referred to as distance information) related to the image and the image together, it is impossible to obtain high resolution distance information and the high resolution image simultaneously without a time difference using one imaging module. This is because the imaging module should use optics having a high Modulation Transfer Function (MTF) feature in order to obtain the high resolution image, the higher MTF is, the lower a Depth Of Field (DOF) is, in order to increase the low DOF, a lens should be moved, and thus the process takes time.

As described above, the meta information related to the image and the image are not obtained simultaneously, and thus the electronic apparatus may not provide the image effect using the obtained image in real time.

Thus, according to various exemplary embodiments of the present disclosure, an electronic apparatus and a method for taking a photograph in the electronic apparatus capable of simultaneously obtaining the meta information related to the image and the image using a depth sensor and the image sensor instead of one imaging sensor may be provided.

In addition, according to various exemplary embodiments of present disclosure, an electronic apparatus and a method for taking a photograph in the electronic apparatus, capable of providing image effects using the meta information related to the image and the image in real time, by simultaneously obtaining the meta information related to the image and the image, may be provided.

According to various exemplary embodiments of the present disclosure, an electronic apparatus includes a display that displays a screen; a depth sensor that outputs a first image signal and depth information; an image sensor that outputs a second image signal; and a control unit that controls to display a preview screen on the display using the first image signal, obtain both depth information of a photographing moment and an image of the photographing moment using the second image signal in response to a request of photographing, and store the image and the depth information.

According to various exemplary embodiments of the present disclosure, a method for taking a photograph in an electronic apparatus, includes receiving a first image signal and depth information from a depth sensor and receiving a second image signal from an image sensor; displaying a preview screen on a display using the first image signal; obtaining both depth information of a photographing moment and an image of the photographing moment using the second image signal according to a request of photographing; and storing the image and the depth information.

According to various exemplary embodiment of the present disclosure, the depth information related to the image and the image may be simultaneously obtained using the depth sensor and the image sensor instead of one imaging sensor.

In addition, according to various exemplary embodiments of the present disclosure, the image effect using the meta information related to the image and the image may be provided in real time by simultaneously obtaining the distance information related to the image and the image.

Before undertaking the DETAILED DESCRIPTION below, it may be advantageous to set forth definitions of certain words and phrases used throughout this patent document: the teems "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
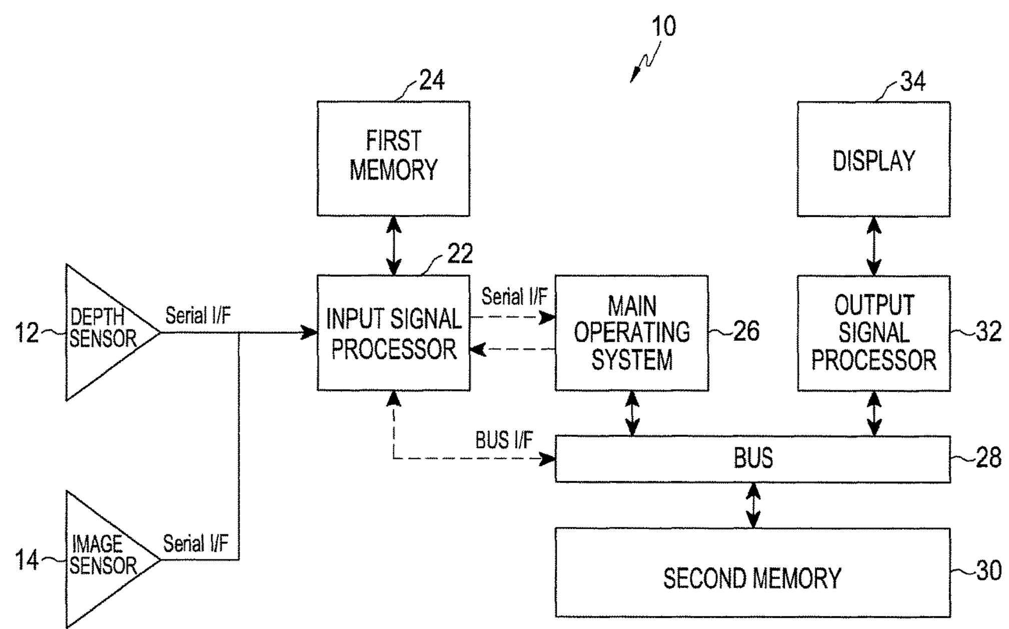
FIG. 1 is a schematic concept view illustrating an electronic apparatus according to an exemplary embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Terms used in various exemplary embodiments of the present disclosure will be described shortly, and the various exemplary embodiments of the present disclosure will be described in detail.

With respect to the terms in the various embodiments of the present disclosure, the general terms which are currently and widely used are selected in consideration of functions of structural elements in the various embodiments of the present disclosure. However, meanings of the terms may be changed according to an inventor's intention, a judicial precedent, appearance of a new technology, and the like. In addition, at a certain case, a term arbitrarily selected by the applicant may be used. In such a case, the meaning of the term will be described in detail at the corresponding part in the description of the present disclosure. Thus, the terms used in various embodiments of the present disclosure should be defined based on the meanings of the terms and the overall contents of the embodiments of the present disclosure instead of simple titles of the terms.

In various embodiments of the present disclosure, when a part "includes" a component element, it does not mean excluding other component elements but it shall be construed that one or more other components can be included unless they are specifically described to the contrary. Also, the term, such as "unit", "module", or the like, means a unit for processing at least a function or an operation, and may be embodied through hardware, software, or a combination hardware and software.

Hereinafter, the various embodiments of the present disclosure will be described in detail with reference to accompanying drawings. However, the present disclosure is not limited or restricted by the embodiments. The same reference numerals of each of the drawings may be designated to members performing the same function.

An electronic device according to various embodiments of the present disclosure may be an electronic device capable of having a camera function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (for example, Samsung HomeSync™, Apple TV™, or Google TV™), a game console, an electronic dictionary, an electronic key, a camcorder, and an electronic picture frame.

According to some embodiments, the electronic device may include at least one of a navigation device and an in-vehicle infotainment device.

According to some embodiments, the electronic device may include at least one of a part of furniture or a building/structure, an electronic board, an electronic signature receiving device, and a projector. The electronic device according to the present disclosure may be a combination of one or more of the aforementioned various devices. Further, it will be apparent to those skilled in the art that the electronic device according to the present disclosure is not limited to the above-mentioned devices, and the present disclosure may be applied to any kind of device having a camera function.

FIG. 1 is a concept view illustrating a concept of an electronic apparatus according to an exemplary embodiment of the present disclosure. Referring to FIG. 1, the electronic apparatus 10 may include a depth sensor 12, an image sensor 14, an input signal processor 22, a first memory 24, a main operating system 26, a bus 28, a second memory 30, an output signal processor 32 and a display 34.

The depth sensor 12 may form an image by focusing light input through a lens to output a first image signal having a comparatively lower resolution and a higher Depth Of Field (DOF) (high F-number) than an image of the image sensor 14. In photographing, when a lens is focused on a subject, the focused subject has a front surface and a rear surface. Here, a DOF may indicate a focused area. When there is a large focused space (including a front side and a rear side of the subject) around the subject, the DOF may be deep (i.e. high). In contrast, when the focused space (including the front side and the rear side of the subject) around the subject is not large, the DOF may be comparatively not deep (i.e. not high). The depth sensor 12 may analyze the first image signal to output meta information. The meta information may include depth information. The depth information may be associated with distance information which indicates whether each pixel of a first image is close to or far from the lens. The nearer each of pixels in the first image is to the lens, the higher a depth numerical value may be. Also, the farther the each of the pixels in the first image is from the lens, the lower the depth numerical value may be. The depth information may include information needed to extract the distance information of the first image.

The image sensor 14 forms an image using the light input through the lens to obtain a second image signal having a comparatively higher resolution than the image of the depth sensor 12. At this time, the image sensor 14 may be disposed as closely as possible to the depth sensor 12 in order to obtain the second image signal equal to a sight of the depth sensor 12.

The input signal processor 22 may be connected to each of the depth sensor 12 and the image sensor 14 through a serial interface. The input signal processor 22 may receive the first image signal having the comparatively low resolution and high DOF and the meta information, e.g., the depth information from the depth sensor 12, and may receive the second image signal having the comparatively high resolution from the image sensor 14. The input signal processor 22 may process the first image signal received from the depth sensor 12 and the second image signal received from the image sensor 14. The input signal processor 22 may extract distance information using the depth information received from the depth sensor 12. The input signal processor 22 may match the distance information to the second image signal.

The first memory 24 may be an exclusive memory of the input signal processor 22. The first memory 24 may temporarily store the first image signal, the second image signal or the depth information input to the input signal processor 22, and may store data when the input signal processor 22 processes a signal. The first memory 24 may be operated independently of the main operating system 26, and may be connected to the input signal processor 22 through a bus or a serial communication.

The main operating system 26 may transmit a signal to the input signal processor 22 and receive the signal from the input signal processor 22 through a serial interface. The main operating system 26 may operate a kernel and various sub system drivers of the electronic apparatus 10, as a main Operating System (OS) of the electronic apparatus 10, and may be included in a controller capable of controlling overall operation of the electronic apparatus 10.

The bus 28 may be a device which enables the main operating system 26 to communicate with various sub systems of the electronic apparatus 10 at high speed. For example, the bus 28 may be a device which enables the main operating system 26 to communicate with the input signal processor 22, the second memory 30, the output signal processor 32 and so on at high speed.

The second memory 30 may store various data required in operating the electronic apparatus, as a main memory, the data may be stored by the main operating system 26, and the stored data may be read by the main operating system 26.

The output signal processor 32 may process the first image signal or the second image signal processed by the input signal processor 22 into a displayable image data to be displayed on the display 34.

The display 34 may display the image data provided by the output signal processor 32, as a main image display device of the electronic apparatus.

Figure 2:
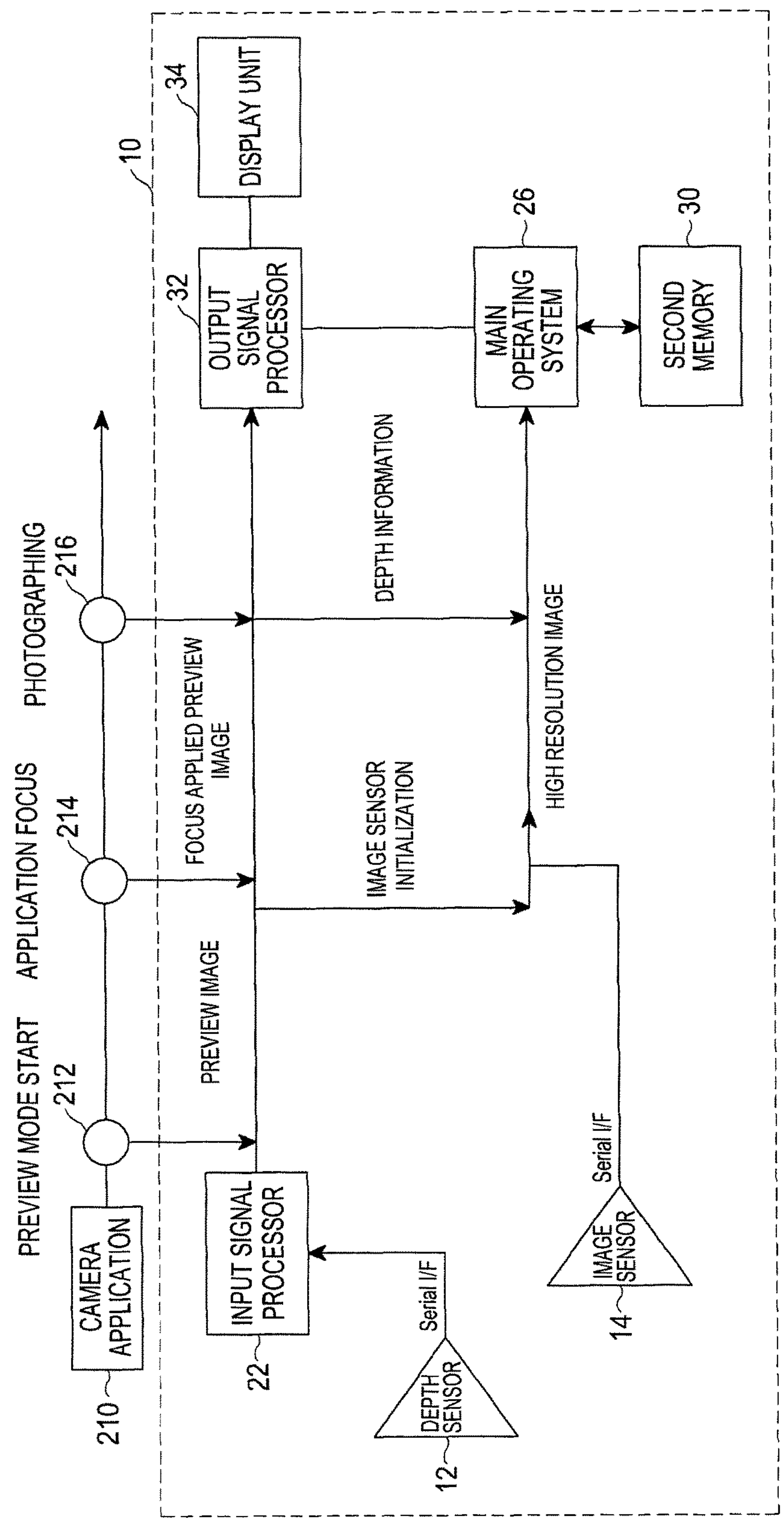
FIG. 2 is a schematic concept view illustrating an operation of the electronic apparatus according to an exemplary embodiment of the present disclosure.

FIG. 2 is a schematic concept view illustrating an operation of the electronic apparatus according to an exemplary embodiment of the present disclosure. According to FIG. 2, the electronic apparatus 10 may execute a camera application 210 according to an exemplary embodiment.

Referring to FIG. 2, when the camera application 210 is executed by the user, the electronic apparatus 10 may start a preview mode 212.

When the preview mode starts, the electronic apparatus 10 may initialize the depth sensor 12 and the image sensor 14 so that the input signal processor 22 may receive the depth information and the first image signal having the comparatively low resolution and the high DOF from the depth sensor 12 and may receive the second image signal having the comparatively high resolution from the image sensor 14.

The input signal processor 22 may process the first image signal of the low resolution in the preview mode to provide a preview image signal, and the preview image signal may be processed through the output signal processor 32 to be displayed on the display 34 as a preview screen. In addition, the input signal processor 22 may extract the distance information using the depth information output from the depth sensor 12 in the preview mode.

When a focus application 214 is requested, the electronic apparatus 10 may apply a focusing effect to the preview screen using the distance information. According to an exemplary embodiment, an area where the focus is applied may be a partial area of the screen, and may be a predetermined area or an area selected by the user. According to an exemplary embodiment, when the area where the focus is applied is a central area, the electronic apparatus 10 applies an out-of-focus effect to a remaining area except for the central area by using the distance information, and may display the preview screen where the out-of-focus effect is applied. According to an exemplary embodiment, when the area where the focus is applied is the selected area, the electronic apparatus 10 applies the out-of-focus effect to a remaining area except for the selected area by using the distance information, and may display the preview screen where the out-of-focus effect is applied.

When a photographing 216 is requested, the electronic apparatus 10 obtains a high resolution image from the second image of a photographing moment through the input signal processor 22, may obtain depth information of the photographing moment, and may match the high resolution image to the depth information of the photographing moment. The matched high resolution image and the depth information of the photographing moment may be transferred to the main operating system 26. The main operating system 26 may store the high resolution image and the depth information to the second memory 30.

The electronic apparatus 10 may apply the focusing effect to the high resolution image, using the stored high resolution image and the depth information. According to an exemplary embodiment, an area where the focus is applied may be a partial area of the high resolution image, and may be a predetermined area or an area selected by the user. According to an exemplary embodiment, when the area where the focus is applied is a central area, the electronic apparatus 10 applies the out-of-focus effect to a remaining area except for the central area by using the distance information, and may display the high resolution image where the out-of-focus effect is applied. According to an exemplary embodiment, when the area where the focus is applied is the selected area, the electronic apparatus 10 applies the out-of-focus effect to a remaining area except for the selected area by using the distance information, and may display the high resolution image where the out-of-focus effect is applied.

Figure 3:
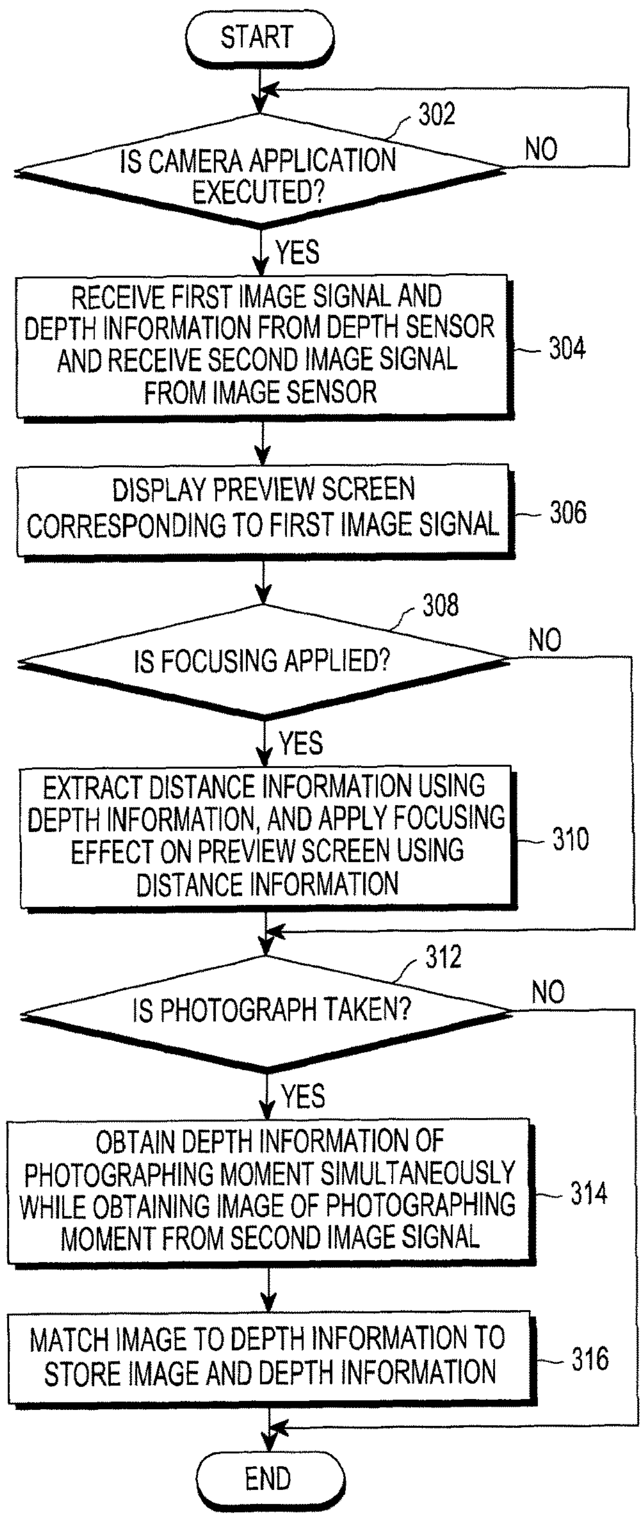
FIG. 3 is a flowchart illustrating a method for taking a photograph in the electronic apparatus according to an exemplary embodiment of the present disclosure.

FIG. 3 is a flowchart illustrating a method for taking a photograph in the electronic apparatus according to an exemplary embodiment of the present disclosure. Referring to FIG. 3, the electronic apparatus 10 may determine whether the camera application is executed at operation 302. If, the camera application is executed, the electronic apparatus 10 may receive the first image signal and the depth information from the depth sensor 12 and receive the second image signal from the image sensor 14 at operation 304. According to an exemplary embodiment, the first image signal may be the low resolution image signal and the second signal may be the high resolution image signal.

The electronic apparatus 10 may display the first image corresponding to the first image signal on the preview screen at operation 306. According to an exemplary embodiment, the electronic apparatus 10 may process the first image signal in the preview mode through the input signal processor 22 to provide the preview image signal, and the preview image signal may be processed through the output signal processor 32 to be displayed on the display 34 as the preview screen.

The electronic apparatus 10 may determine whether the focusing is applied at operation 308. According to an exemplary embodiment, the focusing may be applied according to a predetermined focusing application decision, and may be applied according to a user's request. When it is determined that the focusing is applied, the electronic apparatus 10 may extract the distance information using the depth information and apply the focusing effect to the preview screen using the distance information at operation 310.

According to an exemplary embodiment, the area where the focus is applied may be the partial area of the screen, and may be the predetermined area or the area selected by the user. According to an exemplary embodiment, when the area where the focus is applied is the central area, the electronic apparatus 10 applies the out-of-focus effect to the remaining area except for the central area by using the distance information, and may display the preview screen where the out-of-focus effect is applied. According to an exemplary embodiment, when the area where the focus is applied is the selected area, the electronic apparatus 10 applies the out-of-focus effect to the remaining area except for the selected area using the distance information, and may display the preview screen where the out-of-focus effect is applied.

The electronic apparatus 10 may determine whether the photographing request occurs at operation 312. When the photographing request occurs, the electronic apparatus 10 may obtain the depth information of the photographing moment simultaneously while obtaining the image of the photographing moment from the second image signal at operation 314. According to an exemplary embodiment, the electronic apparatus 10 may obtain the high resolution image and the depth information of the photographing moment.

The electronic apparatus 10 may match the obtained image to the depth information and store at operation 316. The electronic apparatus 10 may apply the focusing effect to the stored image, using the stored image and the depth information.

Figure 4:
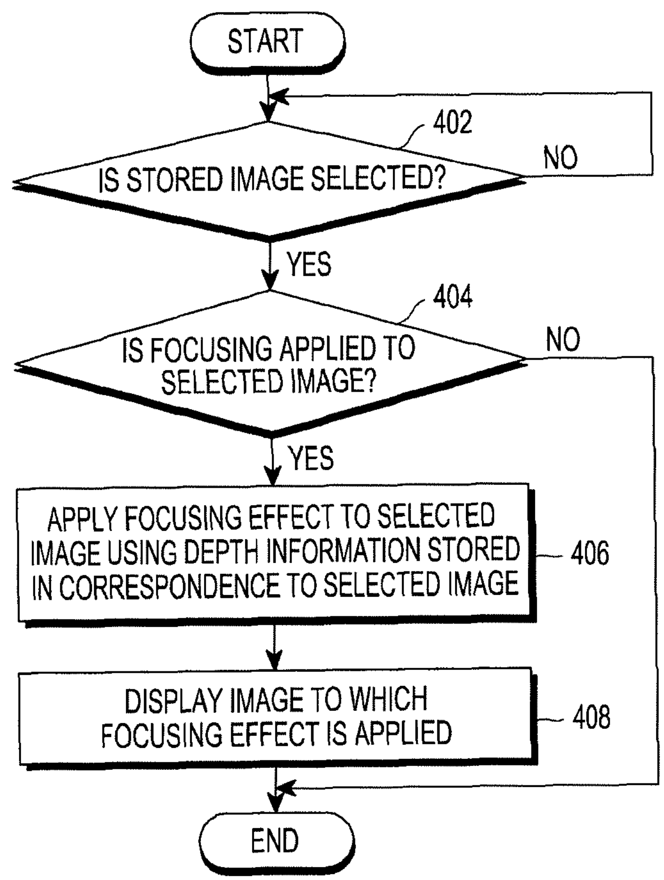
FIG. 4 is a flowchart illustrating a method for applying a focusing effect to a stored image in the electronic apparatus according to an exemplary embodiment of the present disclosure.

FIG. 4 is a flowchart illustrating a method for applying the focusing effect to the stored image in the electronic apparatus according to an exemplary embodiment of the present disclosure. Referring to FIG. 4, the electronic apparatus 10 may determine whether the stored image is selected at operation 402. According to an exemplary embodiment, the electronic apparatus 10 may determine whether an image, to which the focusing effect is applied, among images stored in the second memory 30 is selected by the user.

When the stored image is selected, the electronic apparatus 10 may determine whether the focusing is applied to the selected image at operation 404. When it is determined that the focusing is applied, the electronic apparatus 10 may apply the focusing effect to the selected image using the stored depth information corresponding to the selected image at operation 406. According to an exemplary embodiment, the area where the focus is applied may be the partial area of the screen, and may be the predetermined area or the area selected by the user. According to an exemplary embodiment, when the area where the focus is applied is the central area, the electronic apparatus 10 applies the out-of-focus effect to the remaining area except for the central area using the distance information, and may display the preview screen where the out-of-focus effect is applied. According to an exemplary embodiment, when the area where the focus is applied is the selected area, the electronic apparatus 10 may apply the out-of-focus effect to the remaining area except for the selected area using the distance information. The electronic apparatus 10 may display the image where the focusing effect is applied at operation 408.

Figure 5:
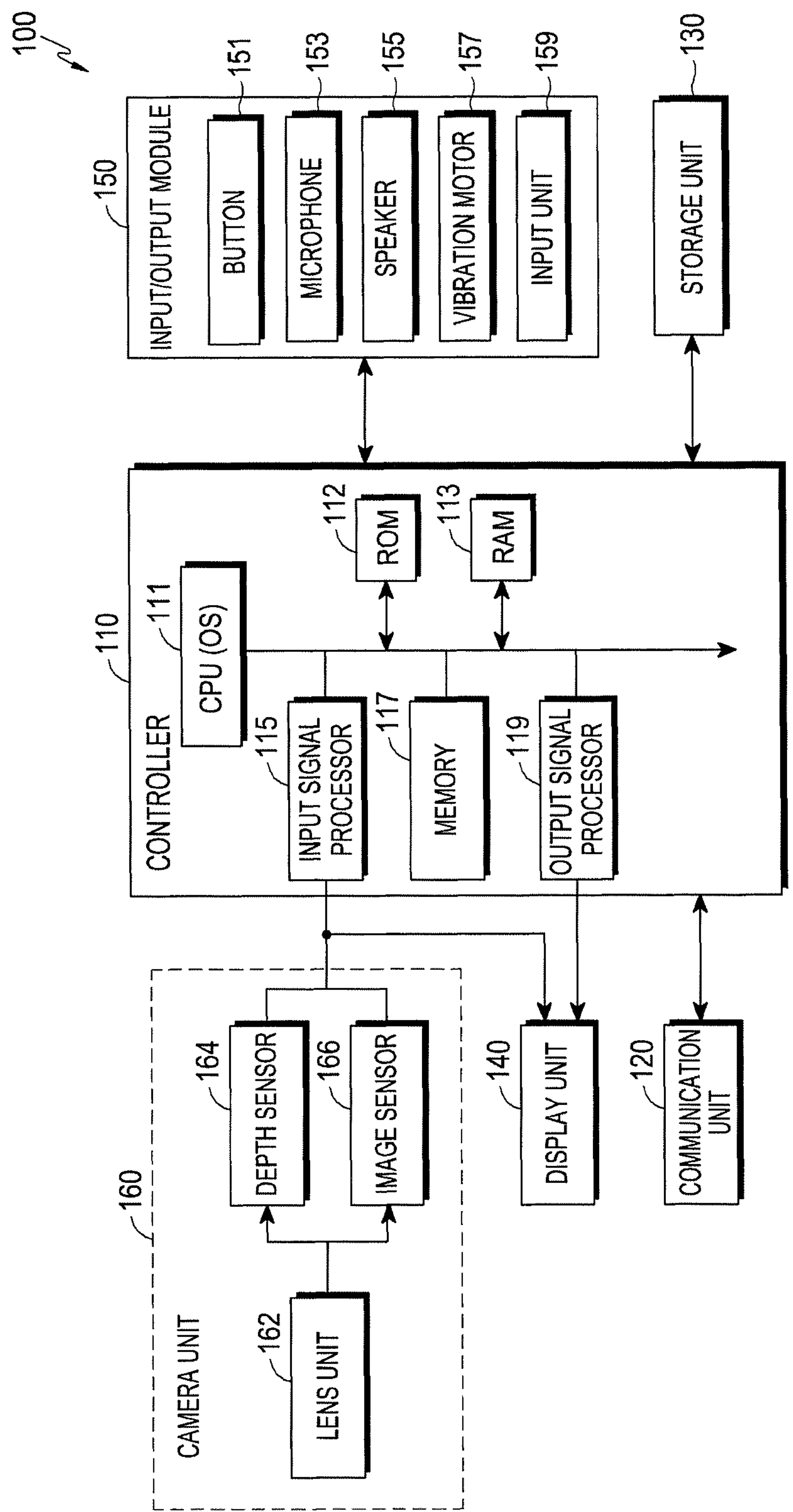
FIG. 5 illustrates a configuration of an electronic apparatus to which the method for taking the photograph according to various exemplary embodiments of the present disclosure is applied.

FIG. 5 is a view illustrating a configuration of an electronic apparatus 100 to which the method for taking the photograph according to various exemplary embodiments of the present disclosure is applied.

Referring to FIG. 5, the electronic apparatus 100 may include a control unit 110, a communication unit 120, a storage unit 130, a display unit 140, an input/output unit 150 and a camera unit 160.

The control unit 110 may include a Central Processor Unit (CPU) 111. The control unit 110 may further include a plurality of Digital Signal Processors (DSPs). The DSPs may include an input signal processor 115 and an output signal processor 119.

The CPU 111 may include a single core, a dual core, a triple core, or a quad core. The CPU 111 may be mutually connected with a ROM 112, a RAM 113, the input signal processor 115, a memory 117, the output signal processor 119 through an internal bus. The control unit 110 may control the communication unit 120, the storage unit 130, the display unit 140, the input/output unit 150 and the camera unit 160. For example, the control unit 110 may perform a function of controlling overall operations of the electronic apparatus 100, and control a signal flow between structural elements.

The input signal processor 115 may be connected to each of a depth sensor 164 and an image sensor 166. The input signal processor 115 may receive the depth information and the first image signal having the comparatively low resolution and the high DOF from the depth sensor 164, and may receive the second image signal having the comparatively high resolution from the image sensor 166. The input signal processor 115 may process the first image signal received from the depth sensor 164 and the second image signal received from the image sensor 166. The input signal processor 115 may extract the distance information using the depth information received from the depth sensor 164. The input signal processor 115 may match the distance information to the second image signal.

The memory 117 may be an exclusive memory of the input signal processor 115. The memory 117 may temporarily store the first image signal, the second image signal or the depth information input to the input signal processor 115, and may store data when the input signal processor 115 processes a signal. The memory 117 may be operated independently of the CPU 111, and may be connected to the input signal processor 115 through a bus or a serial communication.

The output signal processor 119 may process the first image signal or the second image signal processed by the input signal processor 115 into a displayable image data to display on the display unit 140.

The communication unit 120 may enable the electronic apparatus 100 to be connected to an external device. The external device may include other electronic devices (not shown) such as a cellular phone (not shown), a smartphone (not shown), a tablet PC, etc. For example, the communication unit 120 may include at least one of a mobile communication module, a Near Field Communication (NFC) module, a WIFI module and a Bluetooth (BT) module. The communication unit 120 enables the electronic apparatus 100 to transmit or receive a wireless signal for a voice call, a video call, a text message (SMS) or a multimedia message (MMS) to or from another electronic device, such as the cellular phone (not shown), the smartphone (not shown), the tablet PC and so on having a telephone number input to the electronic apparatus 100 according to a control of the control unit 110. In addition, the communication unit 120 may transmit or receive an NFC signal to or from another electronic device through the NFC module, may be connected to a BT communication network through the BT module, or may be connected to a WIFI communication network through the WIFI module.

The storage unit 130 may store signals or data input/output in correspondence to the operation of the control unit 110, the communication unit 120, the display unit 140, the input/output unit 150 and the camera unit 160 under a control of the control unit 110. The storage unit 130 may store a plurality of programs and a plurality of applications for controlling the electronic apparatus 100 or the control unit 110 and a program and data for executing various functions (e.g., the camera application). The term "storage unit" may refer to the ROM 112, the RAM 113, the memory 117 in the control unit 110, or a memory card (not shown), e.g., an SD card and a memory stick, inserted in a terminal 100. The storage unit 130 may include a non-volatile memory, a volatile memory, a Hard Disk Drive (HDD), or a Solid State Drive (SSD). The storage unit 130 may be a machine-readable medium, e.g., a computer-readable medium, and the phrase 'machine-readable medium' may be defined as a medium for providing data to the machine so that the machine can perform a specific function. The machine readable medium may be storage medium. The storage unit 130 may include a non-volatile medium and a volatile medium. All of these media should be of a tangible type that allows instructions transferred by the media to be detected by a physical instrument in which the machine reads the instructions through the physical instrument. The machine-readable medium may include at least one of a floppy disk, a flexible disk, a hard disk, a magnetic tape, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM, but is not limited thereto.

The display unit 140 may be a touch screen, and may provide, to the user, a graphic user interface when the camera application is performed. For example, the display unit 140 may receive various gesture inputs including proximity, a touch and the like, through a user's body, e.g., fingers including a thumb, or a touchable input unit 159, e.g., a pen. The display unit 140 may be implemented in a resistive type display screen, a capacitive type display screen, an infrared type display screen, or an ultrasonic wave type display screen. The display unit 140 as described above may display a preview screen using the camera application, a preview screen to which the focus is applied, and a screen of the stored image and so on, under the control of the control unit 110 according to the exemplary embodiment of the present disclosure.

The input/output unit 150 may include a button 151, a microphone 153, a speaker 155, and an input unit 159. The input/output unit 150 is not limited to those described above, and may include a cursor controller such as a mouse, a trackball, a joystick and cursor directional keys, in order to control movement of a cursor on the display unit 140 and the communication with the control unit 110. One or more buttons 151 may be provided for the electronic apparatus 100, and may provide various input signals to the control unit 110 according to a pushing operation of the user. The microphone 153 is capable of receiving an input of voice or sound involved in various sound sources to generate electric signals under the control of the control unit 110. The speaker 155 may output sound corresponding to various signals, e.g., a wireless signal, a broadcasting signal, a digital audio file, a digital video file and so on, received through a wireless network access under the control of the control unit 110 to outside of the electronic apparatus 100. The input unit 159 may be inserted and stored in the electronic apparatus 100, or may be a separately configured device or object, and in the case that the input unit 159 is inserted and stored in the electronic apparatus 100, the input unit 159 may be withdrawn or detached. The input unit 159 may be an input means such as a stylus pen (hereinafter, referred to as a pen), or a user's finger, which is capable of performing an input such as proximity or a touch into the display unit 140

The camera unit 160 may include a lens 162, the depth sensor 164 and the image sensor 166. The depth sensor 164 may form an image by focusing light input through the lens 162 to output the first image signal having the comparatively lower resolution and the higher DOF (high F-number) than an image of the image sensor 166. In photographing, when a lens is focused on a subject, the focused subject has a front surface and a rear surface. Here, a DOF may indicate a focused area. When there is large focused space (including a front side and a rear side of the subject) around the subject, the DOF may be deep (i.e. high). In contrast, when the focused space (including the front side and the rear side of the subject) around the subject is not large, the DOF may be comparatively not deep (i.e. not high). The depth sensor 164 may analyze the first image signal to output the depth information. The depth information may be associated with distance information which indicates whether each of pixels in a first image is close to or far from the lens. The nearer each of the pixels in the first image is to the lens, the higher a depth numerical value may be. Also, the farther the each of the pixels in the first image signal is from the lens, the lower the depth numerical value may be. The depth information may include information needed to extract the distance information of the first image.

The image sensor 166 forms an image using the light input through the lens 162 to obtain the second image signal having the comparatively higher resolution than the image of the depth sensor 164. At this time, the image sensor 164 may be disposed as closely as possible to the depth sensor 164 in order to obtain the second image signal equal to a sight of the depth sensor 164.

Figure 6:
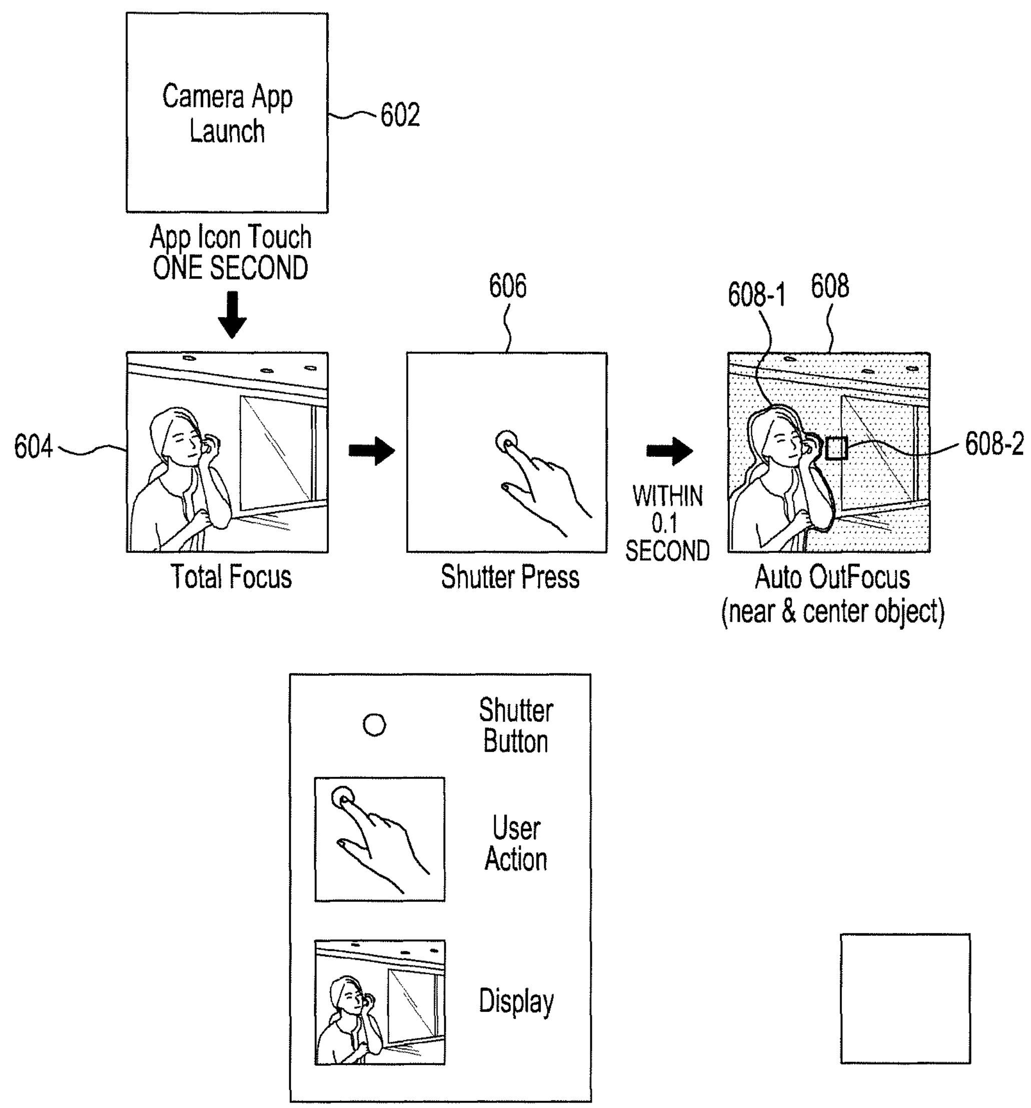
FIGS. 6 and 7 illustrate a user interface screen when the electronic apparatus according to the various exemplary embodiments takes a photograph.
Figure 7:
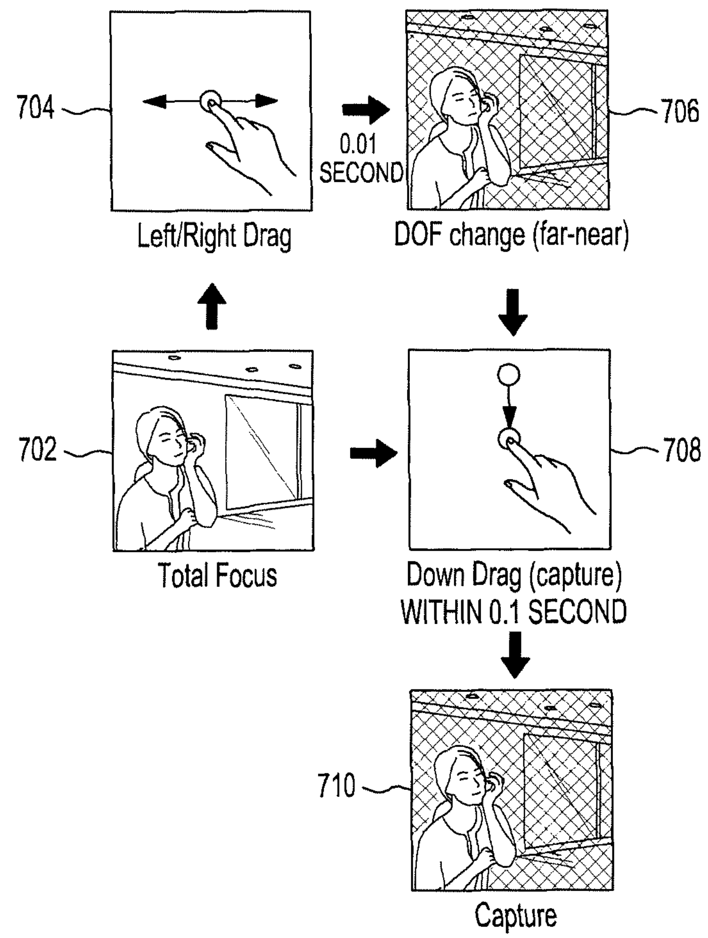
Figure 7:
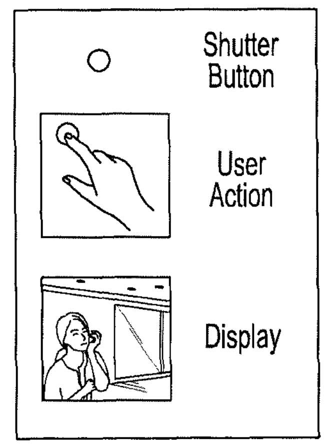

FIGS. 6 and 7 illustrates a user interface screen when the electronic apparatus according to the various exemplary embodiments takes a photograph.

First, referring to FIG. 6, when an application icon corresponding to the camera application is touched in the screen of the display unit by the user, the electronic apparatus 100 may perform a camera application launching 602 within a predetermined time (for example, 1 second).

When the camera application is launched, the electronic apparatus 100 may receive the first image signal of the low resolution from the depth sensor 164, and may receive the second image signal of the high resolution from the image sensor 166.

The electronic apparatus 100 may display a first preview screen 604 using the first image signal. The first preview screen 604 may be in a state where the focus is not applied, or in a state where the focus is applied to the whole screen, that is, the total focused state.

The electronic apparatus 100 may determine that a shutter pressing 606 is performed by the user on the first preview screen 604 in the state when the first preview screen 604 is displayed.

When the shutter pressing 606 by the user is performed, the electronic apparatus 100 may apply the focusing to the first preview screen 604 within a predetermined time (e.g., 0.1 second), and may display a second preview screen 608 to which the focusing effect is applied. At this time, the electronic apparatus 100 may extract the distance information using the depth information, and may apply the focusing effect to the preview screen using the distance information.

According to an exemplary embodiment, the electronic apparatus 100 may apply an auto out-of-focus to the first preview screen 604, and may display the second preview screen 608 to which the auto out-of-focus is applied. According to an exemplary embodiment, the auto out-of-focus may apply the out-of-focus effect to the remaining area except for a near object area 608-1 or apply the out-of-focus effect to the remaining area except for a center object area 608-2.

Meanwhile, referring to FIG. 7, the electronic apparatus 100 may determine 704 that one drag input of a left or right drag is performed by the user in the state when the first preview screen 702 is displayed according to the launch of the camera application.

When one drag input of the left or right drag is performed by the user, the electronic apparatus 100 may change the DOF into a far distance or a near distance in the first preview screen 702 within a predetermined time (for example, 0.1 second) to apply the focus, and may display the second preview screen to which the focus effect is applied. For example, when the left drag input is performed by the user, the electronic apparatus 100 may change the DOF into the far distance in the first preview screen 702 to apply the focus, and may display the second preview screen 706 to which the focus effect is applied. On the other hand, when the right drag input is performed by the user, the electronic apparatus 100 may change the DOF into the near distance in the first preview screen 702 to apply the focus, and may display the second preview screen 706 to which the focus effect is applied.

The electronic apparatus 100 may determine 708 a down drag input is performed by the user in the state when the preview screen such as the first preview screen 702 or the second preview screen 706 is displayed. When the down drag input is performed by the user, the electronic apparatus 100 may capture (photograph) the image within a predetermined time (for example, 0.1 second), and may store the photographed image 710.

According to an exemplary embodiment, when the down drag input is performed by the user, the electronic apparatus 100 may obtain the depth information of the photographing moment while simultaneously obtaining the image of the photographing moment from the second image signal, and may match the image and the depth information to store the image and the depth information. The electronic apparatus 100 may apply the focusing effect to the stored image, using the stored image and the depth information.

The methods according to the various embodiments of the present disclosure may be in a form of program instructions executed through various computer means to be recorded in a computer readable medium. The computer-readable medium may include a program command, a data file, and a data structure individually or a combination thereof. The program instructions recorded in the medium may be specially designed and configured for the present disclosure, or may be known to and usable by those skilled in the field of computer software.

It will be appreciated that the photographing method according to the present disclosure may be implemented in the form of hardware, software, or a combination of hardware and software. Any such software may be stored, for example, in a volatile or non-volatile storage device such as a ROM, a memory such as a RAM, a memory chip, a memory device, or an IC, or an optical or magnetic recordable and machine (e.g., computer) readable medium such as a CD, a DVD, a magnetic disk, or a magnetic tape, regardless of the storage device's ability to be erased or the storage device's ability to be re-recorded. It can also be noted that the photographing method according to the present disclosure may be implemented by a computer or an electronic device including a memory and a controller, and the memory is an example of a machine-readable storage medium suitable for storing a program or programs including instructions that implement embodiments of the present disclosure. Therefore, the present disclosure may include a program including a code for implementing the apparatus or the method defined in the appended claims of the present specification and a machine (computer, etc.)-readable storage medium for storing the program. Further, the program may be electronically transferred by a medium such as a communication signal transferred through a wired or wireless connection, and the present disclosure appropriately includes equivalents of the program.

Furthermore, the mobile electronic device according to the embodiments of the present disclosure may receive and store the program from a program providing device connected thereto in a wired or wireless manner. The program providing device may include a memory that stores a program including instructions for performing the photographing method according to various embodiments of the present disclosure, a communication unit that performs wired or wireless communication with the electronic device, and a controller that controls the corresponding program to be transmitted through the communication unit at the request of the electronic device or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic apparatus comprising:
- a display configured to display a screen;
- a depth sensor configured to output a first image signal based on a first resolution and depth information;
- an image sensor configured to output a second image signal based on a second resolution; and
- one or more processors configured to:
  - obtain the depth information based on the first image signal while displaying a preview screen on the display using the first image signal;
  - obtain an image of a photographing moment using the second image signal and depth information matched to the image of the photographing moment in response to a request for photographing during the displaying of the preview screen with the first image signal; and
  - store the image and the depth information,
- wherein the one or more processors are further configured to apply a focusing effect to the preview screen using the depth information, and
- wherein the focusing effect is an effect of applying an out-of-focus to a remaining area except for a partial area of the preview screen.

2. The electronic apparatus of claim 1, wherein the first resolution is lower than the second resolution.

3. The electronic apparatus of claim 1, wherein the partial area of the image is a predetermined area.

4. The electronic apparatus of claim 1, wherein the partial area of the image is an area selected by a user.

5. The electronic apparatus of claim 1, wherein the electronic apparatus is a mobile phone.

6. A method for taking a photograph in an electronic apparatus, the method comprising:
- receiving a first image signal based on a first resolution and depth information from a depth sensor;
- receiving a second image signal based on a second resolution from an image sensor;
- obtaining the depth information based on the first image signal while displaying a preview screen on a display using the first image signal;
- obtaining an image of a photographing moment using the second image signal and depth information matched to the image of the photographing moment in response to a request of photographing during the displaying of the preview screen with the first image signal;
- storing the image and the depth information; and
- applying a focusing effect to the preview screen using the depth information,
- wherein the focusing effect is an effect of applying an out-of-focus effect to a remaining area except for a partial area of the preview screen.

7. The method of claim 6, wherein the first resolution is lower than the second resolution.

8. The method of claim 6, wherein the partial area of the image is a predetermined area.

9. The method of claim 6, wherein the partial area of the image is an area selected by a user.

10. The method of claim 6, wherein the electronic apparatus is a mobile phone.

11. A non-transitory computer readable medium comprising program code that when executed by at least one processor causes an electronic apparatus to:
- receive a first image signal based on a first resolution and depth information from a depth sensor;
- receive a second image signal based on a second resolution from an image sensor;
- obtain the depth information based on the first image signal while displaying a preview screen on a display using the first image signal;
- obtain an image of a photographing moment using the second image signal and depth information matched to the image of the photographing moment in response to a request of photographing during the displaying of the preview screen with the first image signal;
- store the image and the depth information; and
- applying a focusing effect to the preview screen using the depth information,
- wherein the focusing effect is an effect of applying an out-of-focus to a remaining area except for a partial area of the preview screen.

12. The computer readable medium of claim 11, wherein the first resolution is lower than the second resolution.

13. The computer readable medium of claim 11, wherein the partial area of the image is a predetermined area.

14. The computer readable medium of claim 11, wherein the partial area of the image is an area selected by a user.

* * * * *